Patented Dec. 17, 1929

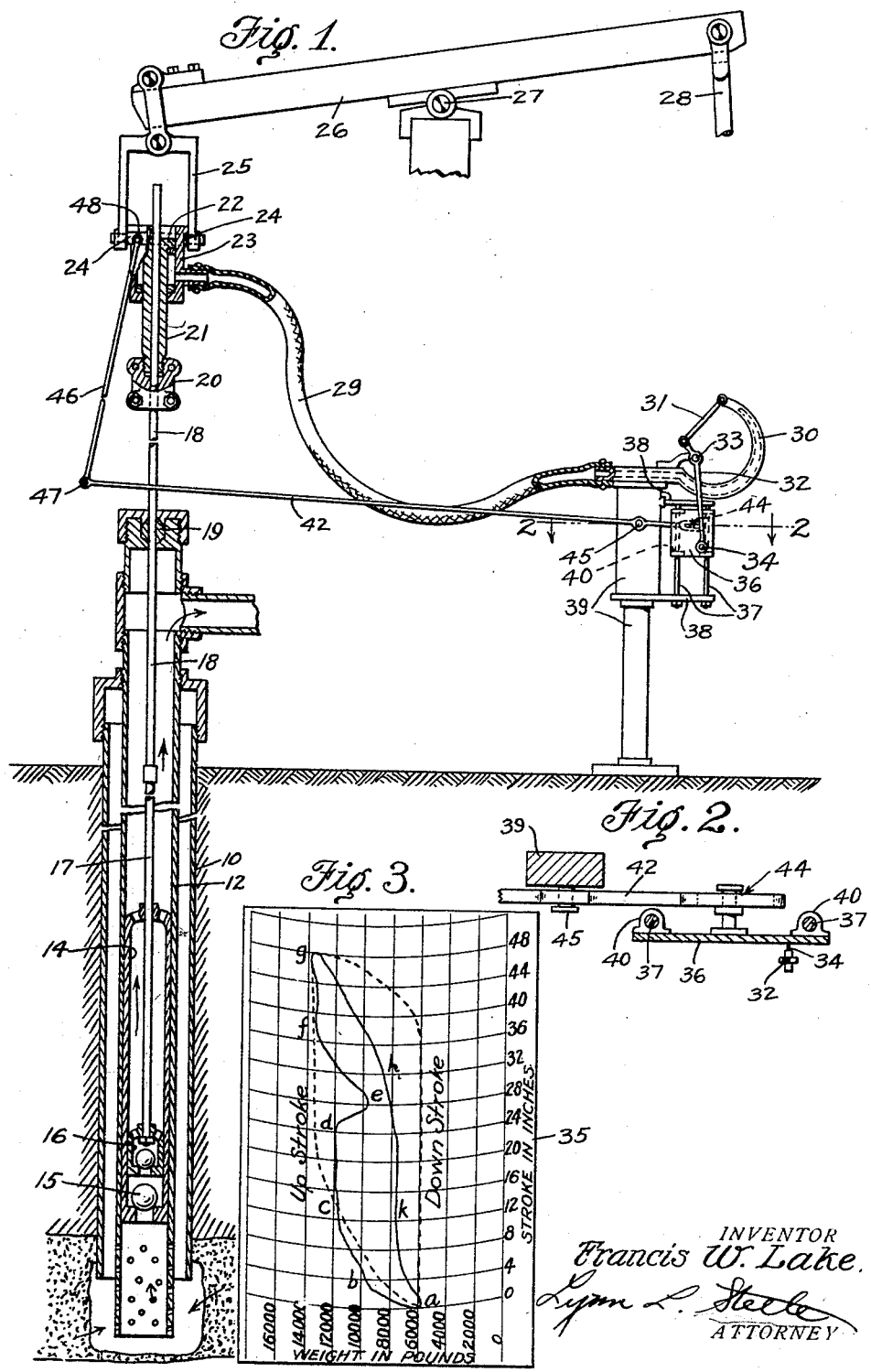

1,739,724

UNITED STATES PATENT OFFICE

FRANCIS W. LAKE, OF WHITTIER, CALIFORNIA, ASSIGNOR TO UNION OIL COMPANY OF CALIFORNIA, OF LOS ANGELES, CALIFORNIA, A CORPORATION OF CALIFORNIA

RECORDING DYNAMOMETER AND METHOD OF MEASURING LOAD VARIATIONS

Application filed July 18, 1927. Serial No. 206,683.

This invention relates to devices for recording power-transmission conditions and particularly is a mechanism for showing the load variations as imposed by the sucker rod upon the polish rod and walking beam of an oil-well pumping outfit during both the up and down strokes of the pump, and for recording or measuring the variations in the load so imposed.

The ultimate object of the invention is to obtain maximum efficiency in the production of oil by pumping, while its more immediate object is to facilitate the preparation of accurate records showing the load upon the polish rod and walking beam, and the variations and distribution of the load as transmitted to the walking beam, or other pump-actuating mechanism, throughout the entire stroke. A careful study of these records enables one to interpret them and to draw conclusions as to the real conditions existing within a well. By making various changes in methods and equipment, and by studying the effects of these changes as disclosed by the records, improper conditions may be remedied and the most advantageous and economical equipment and methods may be employed.

The invention resides, brifly stated, in the combination of a dynamometer head (which may be any device sensitive to load effects and capable of transmitting them), with a pump and its sucker rod operating in an oil well, pump operating means, and a recording device for indicating load variations thereon during cycles of operation. Generically, the invention comprises a deep well pump, means at the surface for operating said pump, and means preferably at the surface for indicating load variations during an operating cycle. In the preferred embodiment the recording device includes a gauge having an accurately calibrated chart movable in proportion to the stroke and upon which chart a curve may be described by a pen on the gauge. The dynamometer head preferably contains a fixed liquid body interposed between the sucker rod and the walking beam and upon which the load from the sucker and polish rods is first imposed and by which the pressure thus applied upon the liquid is transmitted to the gauge, preferably through a flexible line. Thus, the rate of load-change with respect to the stroke is recorded and the conditions within the well may be interpreted from the resulting curve on the chart.

While the invention is particularly shown and described as used in connection with the sucker rod of a reciprocating pump, it is obvious that a cable might be employed instead of the rod. Likewise, the rod or cable might be that of any other well tool or implement, the operating stresses upon which are to be measured or recorded.

In the accompanying drawing wherein one embodiment of the invention is shown by way of illustration only, Fig. 1 is a view partly in elevation and partly in vertical section showing one form of dynamometer head and one form of gauge hooked up in operative relation with each other and with the polish and sucker rods of a pump;

Fig. 2 is a cross-section taken on the line 2—2 of Fig. 1 indicating the mounting for the chart-carrying board; and Fig. 3 represents a curve recorded by the apparatus indicated.

The drawings disclose an oil well casing 10 receiving the tubing 12 in which is located a pump barrel 14 containing the standing valve 15 and the valved piston 16 operated by sucker rod 17 connected with a polish rod 18 which projects through the packing gland 19. The polish rod 18 is secured by means of clamp 20 to rod 21 of a piston 22 working in a cylinder 23 against a body of non-compressible liquid, such as castor oil, by means of which the applied pressure is adapted to be conducted through a flexible non-expansible line 29. Said cylinder 23 is surrounded by a yoke 24 supporting said cylinder and in turn supported by reins 25 carried by the walking beam 26 which is fulcrumed at 27 and actuated from a power plant as through the medium of a pitman 28.

The pressure transmitted through line 29 by the liquid contained therein is conveyed to a spring gauge 30 which through the medium of a link 31 and an arm 32 pivoted at 33, causes a pen 34 on the end of lever 32 to oscillate upon a chart 35 (Fig. 3) carried by a vertically reciprocating chart carrier or board 36, riding upon rods 37 supported by brackets 38 on a standard or other suitable support 39. As best seen in Fig. 2, the rods 37 receive guides 40 on the back of board 36 whereby said board is guided in its vertical movements. Said board and its chart 35 are reciprocated through the medium of a lever 42 having a stud and slot connection with the back of the board 36 as is generally indicated at 44. The lever 42 is fulcrumed at 45 on the stand 39 and its remote end is actuated by a link 46 pivoted thereto at 47 and connected with the yoke 24 by means of a pivoted connection 48, whereby as polish rod 18 and its pump are reciprocated proportional movement will be transmitted to the chart-carrying board 36 through the medium of the link 36 and lever 42.

Fig. 3 shows a chart actually produced by this mechanism, this chart indicating the rate of and variation in load increase on the upstroke and the rate of falling off in load on the down stroke. As the polish rod and the pump are elevated by the movement of the walking beam 26, the load imposed by the pump and the oil caught thereby is transmitted to the liquid in cylinder 23, and thence by way of line 29 to the torque tube 30 of the spring gauge which tends to expand and thereby through the medium of link 31 causes the pen 34 to swing toward the left. At the same time, the chart 35 is caused to descend through the medium of the lever 42. Thus, any fluctuation in load which causes the pen to oscillate will be recorded upon the chart as it descends and as can be plainly seen from Fig. 3. Likewise, when the pump begins to descend, the falling-off of the load will be actually recorded upon the chart.

Thus the curve so recorded shows the actual load which is placed upon the polish rod at every point in both the up and down strokes, and a study thereof will reveal many conditions and enable the determination of the best conditions for operation in order that the best and most economical equipment and methods for the desired results may be employed. From such a study one may efficiently determine the proper depth for pumping, the proper size of the working barrel and its parts; the most advantageous speed and length of stroke; the most effective and efficient counter-balance; the proper type of valves; and numerous other details, without the time and expense required for long experimental runs of the wells under each of the varying conditions. If the equipment does not come up to expectations, the curves obtained will show where exceptional strains or loads develop and will offer a means for determining how to counteract them; for example, essential to economical pumping is correct counter-balancing, and for this purpose when a curve is properly transferred and projected into a wrist-pin load curve, or a band-wheel shaft torque diagram, this will give accurately and quickly the proper counter-balancing weights and methods for most efficiency in pumping. In addition such curve, when properly studied, will show the advantages to be gained in production as against the disadvantages of more strenuous wear on producing equipment so that an economical balance between these two factors can be obtained and the most efficient producing conditions established.

The various factors are adjusted in the manner described above, as will be understood by those skilled in the art, until the curve indicates that the most efficient, i. e., normal, conditions obtain. The abnormalities originally indicated are removed by correcting the inefficiencies which they indicate. On correct adjustment maximum efficiency as indicated by minimum power for maximum oil lifted to the surface, will be obtained.

The chart shown in Fig. 3 may be interpreted as follows:

On the upstroke, the portion $ab$ of the curve indicates an abnormal stretch of the pump rod due to a tight plunger. The portion $bc$ represents the normal pick-up of the load after the rod stretch has been taken up. The portion $cd$ represents a normal load during this part of the stroke. The section $de$ indicates a rebound action which was caused by the abnormal stretch of the rods and took place upon a slowing down of the stroke as the band wheel passed the horizontal center, and the portion $ef$ represents a corresponding rebound in the opposite direction; thus, the irregular curve $df$ as a whole indicates an abnormal vibration in the pump rod. The section $fg$ which concludes the upstroke represents the last of the straight load which commenced with the portion $cd$. Thus, it is clear that the upstroke curve indicates the presence of undesirable conditions, whereas ideal conditions would be represented by a uniform curve as indicated in dotted lines. In order to obtain this desirable condition, various changes might be made. For example, a heavier rod could be used which would not stretch so freely, or a looser plunger could be employed, or better counter-balancing might be obtained, or the apparatus could be run at a slower speed, although a slower speed would ordinarily be inefficient. In the present case substitution of a looser plunger will meet the requirements. On the down stroke the curve portion $gh$ indicates that the load is not immediately removed from the standing valve of the pump due to a gas pocket which is being compressed in the pump. The portion $hk$ indicates normal return, and the part $ka$ indicates an abnormal speed. Desirable conditions would produce the curve shown in dotted lines and these could be obtained by using a lower travelling valve or a positive travelling valve in order to reduce or eliminate the gas pocket and permit prompt unloading. These changes will also smooth out the variation in the section $ka$, although this last variation might also be corrected by changing the speed.

From the foregoing, it is apparent that many undesirable conditions can be determined by analysis of the chart, and that the application of dynamometers and recording apparatus such as will furnish these records for pumping wells, is of much importance.

The above is merely illustrative of the generic invention and is not to be understood as limiting since many variations which will be apparent to those skilled in the art, may be made within the scope of the following claims.

I claim:

1. Means for recording load variations in a deep well pump comprising a dynamometer head containing a non-compressible fluid body, said head being adapted to be interposed between the pump and actuating means therefor whereby the load stress is transmitted to said body, a recording member actuated from said body, a chart upon which said member records a curve, and means adapted to be connected with the pump for reciprocating said chart during recording.

2. Means for recording load variations in a deep well pump comprising a dynamometer head containing a fluid body, pump actuating means therefor, means for connecting said head to said pump and to said actuating means whereby the load stress is transmitted to said body, a pressure recording member actuated by said body, a chart upon which said member records a curve, and means connected with the pump for reciprocating said chart during actuation of said pump.

3. In combination, a deep well pump, actuating means for the pump, a dynamometer head disposed between said pump and said means and adapted to receive and transmit load stresses, a recording member actuated by stresses transmitted to said head, a chart adapted to receive a curve recorded by said member, and means connected with and actuated by said pump to move said chart.

4. In combination, a deep well pump, actuating mechanism therefor, a non-compressible fluid body interposed between the pump and the actuating mechanism for receiving and transmitting the load stress, a chart, means actuated by said pump and connected with the chart for moving the latter, a recorder and means for transmitting said stress to said recorder to record a curve on said chart.

5. In combination, a deep well reciprocating pump having a sucker rod extending to the surface, pump actuating means at the surface, a dynamometer connected between said rod and said actuating means and comprising a cylinder containing a quantity of fluid and a piston working in the cylinder upon the liquid, a recorder connected with the cylinder and actuable by said fluid, a chart to receive a curve described by said recorder, and means connected with the chart for imparting movement thereto and connected with said head for actuation therewith.

6. In combination, a reciprocating deep well pump and a dynamometer connected therewith including force responsive means at the surface connected to a reciprocating part of said pump for indicating load variations thereon during successive cycles of operation of said pump.

7. In combination, a reciprocating deep well pump working at a considerable distance below the surface of the ground, means at the surface for operating said pump, and force responsive means connected to a reciprocating part of said pump for indicating load variations on said pump during an operating cycle.

8. In combination, a deep well reciprocating pump, means for actuating said pump and force responsive means connected to a reciprocating part of said pump for recording the stress variations on the pump reciprocating means.

9. In combination, a deep well reciprocating pump, means at the surface of said well for reciprocating said pump, and force responsive means connected to a reciprocating part of said pump for recording the stress variations of the reciprocating means.

10. In combination, a reciprocating deep well tool working in an earth bore at a considerable depth, means to reciprocate said tool, and force responsive means connected to a reciprocating part of said tool reciprocating means for recording the stress variations imposed upon said reciprocating means.

11. In combination, a reciprocating deep well tool working in an earth bore at a considerable depth, means to actuate said tool, and force responsive means responsive to force variations for recording stress variations imposed on the tool actuating means during successive cycles of operation.

12. In combination a deep well pump, actuating means for the pump, means disposed between said pump and said actuating means and adapted to receive and transmit load stresses, a recording member operatively connected to said load receiving and transmitting means, a chart member adapted to receive a curve formed by said recording member, and means connected with one of said members and actuated through the influence of the pump to move said one member with relation to the other.

13. In combination a deep well pump having a pump rod, actuating means for the rod, means disposed between said rod and said actuating means and adapted to receive and transmit load stresses, a recording device, and a chart device upon which a curve is adapted to be traced by the recording device, one of said devices being connected with said load receiving and transmitting means to be actuated by load stresses transmitted thereby, and the other of said devices being connected with and actuated from the pump rod to move the same with relation to said one device.

14. In combination a deep well pump having a rod, actuating means for the pump rod, means disposed between said pump rod and said actuating means and adapted to receive and transmit load stresses, a recording member, and a recording chart to receive a curve formed by said recording member, one of the mentioned recording parts being connected with the load receiving and transmitting means to be actuated by load stresses transmitted thereby, and one of said recording parts being connected for actuation through the influence of said pump rod whereby one of said recording parts is moved with respect to the other for recording a curve upon the chart.

15. In combination a deep well pump having a plunger and a pump rod, means to actuate the rod, an indicator, means for transmitting stress effects of the pump to said indicator, and means for transmitting travel effects of said rod to said indicator, the indicator including means for simultaneously recording on said indicator the stress variations and the rod travel.

16. In combination a deep well pump having a plunger and a rod, means to actuate the pump, an indicator, means for transmitting load effects of said pump to said indicator, and means for transmitting plunger travel effects to said indicator, the indicator including means for simultaneously recording load variations and plunger travel.

17. In combination a deep well pump having a pump rod, means to actuate the pump, and an indicator connected with said pump, said indicator including means responsive to load variations and means responsive to pump rod travel, said indicator also including recording means and a cooperative connection between the load responsive means and the pump rod responsive means whereby a resultant of said load variation and said pump rod movement is recorded.

18. In combination a deep well pump having a plunger and a pump rod, means to actuate the pump, an indicator connected with said pump, means on said indicator responsive to the motion of the plunger and to load variations of the pump, and means on said indicator for recording the resultant of said plunger and load variations.

19. In combination, a deep well pump having a plunger and a pump rod, means to actuate the rod and plunger, an indicator, means for transmitting load effects of the pump to said indicator, and means for transmitting motion of the rod and plunger to said indicator including means for simultaneously recording said load and said motion on said indicator.

20. In combination, a rod, load-imposing means connected with said rod, actuating means for moving the rod through cycles of operation, means disposed between the rod and the actuating means and adapted to receive and transmit load stresses continuously during successive cycles, a recording member connected with said load receiving and transmitting means, a chart member adapted to receive a curve delineated by said recording member, and means connected with one of said members and actuated under influence of the movement of the rod to move one of said members with relation to the other during recording.

21. In combination, a rod, means for imposing a load upon said rod, means to actuate the rod through cycles of operation, an indicator, means associated with said rod for transmitting load effects of said rod to said indicator, and means for transmitting rod-travel effects to said indicator, the indicator including means for simultaneously recording load variations and rod travel during successive cycles.

22. In combination, a rod, means imposing a variable stress upon said rod, means for moving said rod through a cycle of operation, means associated with said rod for recording stress variations, and means for simultaneously transmitting the effects of said rod movement to the record continuously during a complete cycle of operation.

23. In combination, a rod, means associated with said rod for imposing a variable stress upon said rod, means for moving said rod through a cycle of operation, and means for simultaneously recording rod motion and stress variations during a complete cycle of operation.

24. In combination, a device subject to variable stresses, means associated with said device for reciprocating the same, and means connected to said device and responsive to force variations for simultaneously indicating the reciprocating motion and stress variations continuously during reciprocation.

25. In combination, a device subject to variable stresses, means associated with said device for reciprocating the same, means connected to said device responsive to force variations for indicating the reciprocating motion, and means connected to said device for simultaneously indicating stress variations in the device during a complete cycle of reciprocation.

26. A dynamometer comprising means for measuring at a proximate point the movement at said point of a moving elastic member subject to deformation while moving in a cycle of operation and loaded at a remote point, and means for simultaneously measuring at a proximate point the load imposed upon said member at such proximate point continuously during a complete cycle.

27. A structure according to claim 26 including indicating and recording means for representing the movement and load measurements.

28. In combination, a reciprocating tool, power means for reciprocating said tool, an elastic element connecting the tool with the power means and subject to stress changes resulting from reciprocation of the tool, means for translating the stresses into forces, and means for indicating variations in the forces.

29. In combination, a deep well pump having a pump rod subject to load changes, means to actuate the pump, and an indicator connected with said pump, said indicator including means responsive to load variations and means responsive to pump rod travel.

30. In combination, a deep well pump having a pump rod, means to actuate the pump, and an indicator connected with said pump, said indicator including means responsive to load variations and means responsive to pump rod travel, said indicator also including a cooperative connection between the load responsive means and the pump rod responsive means whereby a resultant of said load variation and said pump rod movement is recorded.

31. In combination, a deep well pump including a reciprocating pump rod extending a considerable distance below the surface of the ground, means at the surface associated with said rod for reciprocating the same, and means for indicating variations in load upon said rod.

Signed at Los Angeles, in the county of Los Angeles and State of California, this 12th day of July A. D. 1927.

FRANCIS W. LAKE.